US012762901B2

(12) United States Patent
Omuro et al.

(10) Patent No.: US 12,762,901 B2
(45) Date of Patent: Oct. 13, 2026

(54) INFORMATION PROCESSING SYSTEM TO CALCULATE DAMAGE IN OIL IN AN ELECTRIC MOTOR

(71) Applicant: TOYOTA JIDOSHA KABUSHIKI KAISHA, Toyota (JP)

(72) Inventors: Keisuke Omuro, Toyota (JP); Atsushi Tabata, Okazaki (JP); Koichi Okuda, Toyota (JP); Hideaki Bunazawa, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 18/988,965

(22) Filed: Dec. 20, 2024

(65) Prior Publication Data

US 2025/0292626 A1 Sep. 18, 2025

(30) Foreign Application Priority Data

Mar. 18, 2024 (JP) ................................. 2024-042483

(51) Int. Cl.
*G07C 5/00* (2006.01)
*G06F 16/903* (2019.01)
*G07C 5/08* (2006.01)

(52) U.S. Cl.
CPC ....... *G07C 5/006* (2013.01); *G06F 16/90335* (2019.01); *G07C 5/0808* (2013.01); *G07C 5/008* (2013.01)

(58) Field of Classification Search
CPC ...... G07C 5/006; G07C 5/0808; G07C 5/008; G06F 16/90335
See application file for complete search history.

(56) References Cited

FOREIGN PATENT DOCUMENTS

JP 2008108247 A * 5/2008

* cited by examiner

*Primary Examiner* — Brian P Sweeney
(74) *Attorney, Agent, or Firm* — SoraIP, Inc.

(57) ABSTRACT

A processing device of an information processing device performs a search process. The search process includes: a first step of calculating a relative frequency distribution of each feature of the original data; a second step of setting a plurality of time windows for clipping data of a partial period of the original data; a third step of clipping data from the original data; a fourth step of calculating a relative frequency distribution of each feature of extracted data; and a fifth step of calculating an error between the relative frequency distribution of the original data and the relative frequency distribution of the extracted data, a trial from the second step to the fifth step being repeatedly performed by changing settings of the time windows. The processing device calculates an index value using the extracted data with the error equal to or less than a threshold.

2 Claims, 6 Drawing Sheets

INFORMATION PROCESSING SYSTEM TO CALCULATE DAMAGE IN OIL IN AN ELECTRIC MOTOR

CROSS-REFERENCE TO RELATED APPLICATION

This application claims priority to Japanese Patent Application No. 2024-042483 filed on Mar. 18, 2024, incorporated herein by reference in its entirety.

BACKGROUND

1. Technical Field

The present disclosure relates to information processing devices.

2. Description of Related Art

Japanese Unexamined Patent Application Publication No. 2008-108247 (JP 2008-108247 A) discloses an information processing device that reduces the size of data for analysis by compressing original data for analysis. The original data for analysis is data collected over a predetermined period using sensors mounted on the vehicle.

The information processing device disclosed in JP 2008-108247 A compresses data by extracting, from the original data, data acquired at the time when a certain vehicle speed is reached and data acquired at the time of an inflection point of the vehicle speed.

SUMMARY

The above information processing device extracts data by focusing only on the vehicle speed. Therefore, the above information processing device cannot extract data according to characteristics of data other than the vehicle speed. There is a demand for an information processing device that can obtain extracted data capturing characteristics of the entire original data including a plurality of features.

An information processing device that solves the above issue acquires original data collected and created over a predetermined period using a plurality of sensors mounted on a vehicle and calculates an index value indicating a magnitude of damage accumulated in oil in an electric motor. The information processing device includes a processing device configured to perform a process. The processing device is configured to calculate a plurality of features based on the original data. The original data includes information on a temperature of the electric motor and a duration of the temperature of the electric motor. The features include data calculated from the temperature of the electric motor and the duration of the temperature of the electric motor. In the information processing device, a search process that is performed by the processing device includes a first step of calculating, for each of the features, a relative frequency distribution of the original data. The search process includes a second step of setting a plurality of time windows for clipping data of a partial period of the original data in such a manner that a sum of periods of all the time windows is shorter than the predetermined period. The search process includes a third step of clipping data from the original data according to the time windows. The search process includes a fourth step of calculating, for each of the features, the relative frequency distribution of extracted data obtained by combining all the data clipped according to the time windows. The search process includes a fifth step of calculating an error between the relative frequency distribution of the original data and the relative frequency distribution of the extracted data. In the search process, after the first step is performed, a trial from the second step to the fifth step is repeatedly performed by changing settings of the time windows. The processing device performs the search process to extract the extracted data with the error equal to or less than a threshold. The processing device is configured to calculate the index value using the extracted data with the error equal to or less than the threshold.

In one aspect of the information processing device, the processing device may be configured to perform clustering. The clustering may be machine learning that groups data of each interval obtained by dividing the original data into intervals of a certain period into a predetermined number of clusters. The processing device may be configured to set the time windows in the second step in such a manner that a proportion of each of the clusters in the extracted data and a proportion of each of the clusters in entirety of the original data are equal.

This information processing device can calculate the index value using the extracted data with the same accuracy as in the case of using the original data. Therefore, this information processing device can calculate the index value in a shorter time than in the case of using the original data.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a data center 500, which is an embodiment of an information processing device, will be described with reference to FIGS. 1 to 6.

Configuration of Information Processing System

Figure 1:
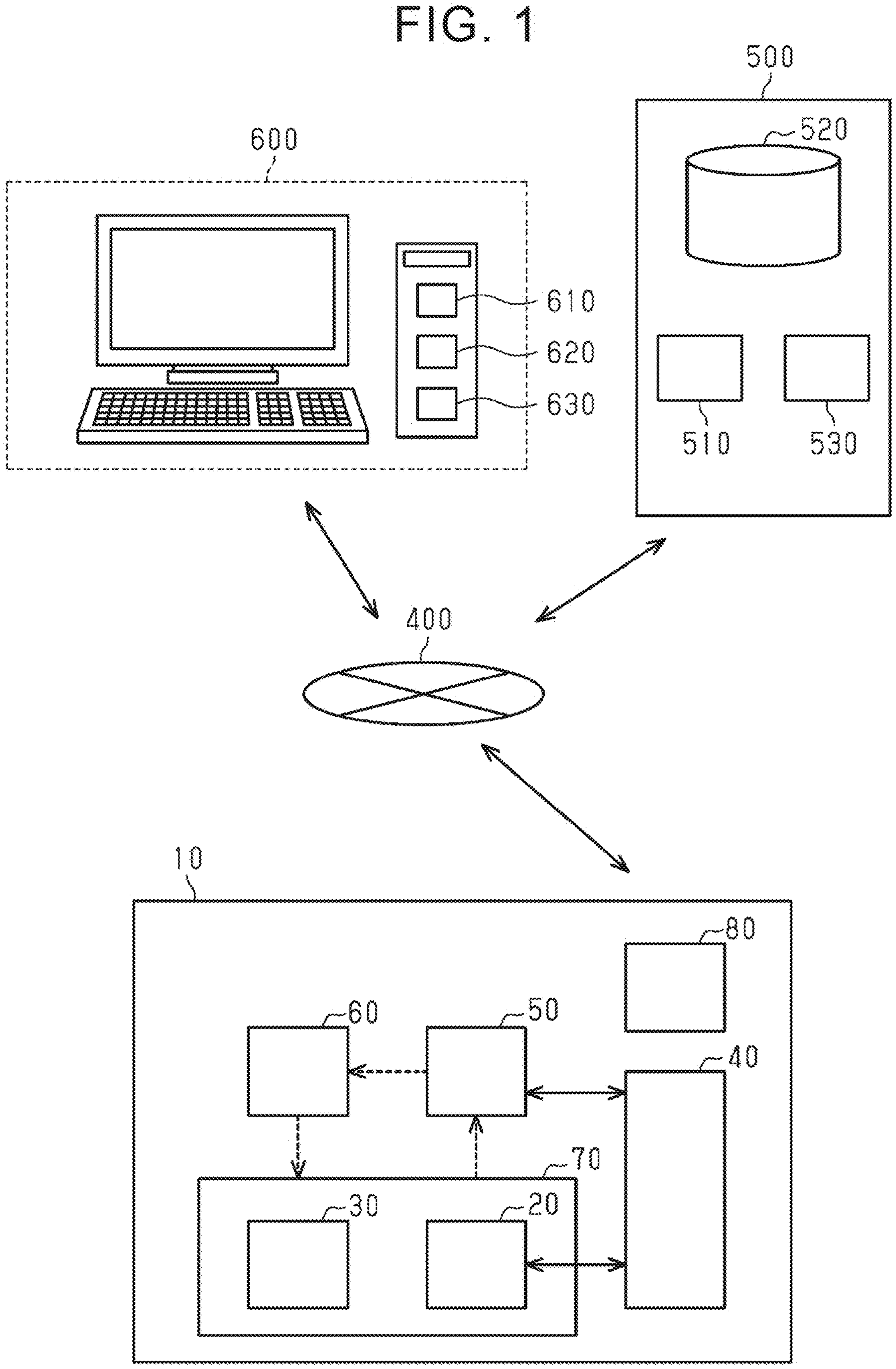
FIG. 1 is a schematic diagram illustrating a relationship between a data center, a vehicle, and an information processing terminal, which is an embodiment of an information processing device.

FIG. 1 shows a configuration of an information processing system including a data center 500. As shown in FIG. 1, the data center 500 communicates with the vehicle 10 via a communication network 400. The data center 500 also communicates with the information processing terminal 600 via the communication network 400. The data center 500 communicates with the plurality of vehicles 10 and the plurality of information processing terminals 600 via the communication network 400.

Configuration of the Data Center 500

As illustrated in FIG. 1, the data center 500 includes a processing device 510. The data center 500 includes a storage device 520 and a communication device 530. The processing device 510 includes a CPU that performs a process according to a program, and a ROM in which the program is stored. The storage device 520 stores a large amount of data. The communication device 530 is implemented as hardware such as a network adapter, various communication software, or a combination thereof. The communication device 530 realizes wired or wireless communication via the communication network 400.

The data center 500 may be configured using a plurality of computers. For example, the data center 500 can be composed of multiple server devices.

Configuration of the Vehicle 10

Each of the plurality of vehicles 10 includes a communication device 80. The communication devices 80 are implemented as hardware such as a network adapter, various communication software, or a combination thereof. These communication devices 80 are configured to realize wired or wireless communication via the communication network 400.

Each vehicle 10 is equipped with a motor 20 that is an electric motor, a power transmission mechanism 30 that transmits the driving force of the motor 20 to the driving wheels of the vehicle 10, and a control device 40 that controls the motor 20. The motor 20 and the power transmission mechanism 30 are housed in a case 70.

Each vehicle 10 further includes an oil pump 50 and an oil cooler 60. The oil pump 50 is controlled by the control device 40. The oil pump 50 delivers the oil in the case 70 to the oil cooler 60. The oil cooled by the oil cooler 60 is fed into the case 70. The motor 20 in the case 70 is cooled by oil.

The control device 40 is equipped with various sensors that collect information of each unit of the vehicle 10.

In each vehicle 10, travel data is collected from the various sensors. The traveling data is transmitted from each vehicle 10 to the data center 500 by the communication device 80. For example, travel data including the travel distance, the position information, and the vehicle speed of each vehicle 10 is transmitted from each vehicle 10 to the data center 500. The travel data also includes various data indicating the state of the motor 20 acquired by the control device 40 and the oil for cooling the motor 20. Identification information for identifying the respective vehicles 10 is also transmitted from the respective vehicles 10 to the data center 500 together with the traveling data.

The data center 500 stores the traveling data together with the received identification information in the storage device 520. In this way, traveling data of the plurality of vehicles 10 is accumulated in the storage device 520 of the data center 500.

Configuration of the Information Processing Terminal 600

The information processing terminal 600 includes a processing device 610, a storage device 620, and a communication device 630. The processing device 610 includes a CPU that performs a process according to a program, and a ROM in which the program is stored. The storage device 620 stores data. The communication device 630 is implemented as hardware such as a network adapter, various communication software, or a combination thereof. The communication device 630 realizes wired or wireless communication via the communication network 400. The information processing terminal 600 is, for example, a personal computer.

Analysis of Travel Data of the Vehicle 10

The information processing terminal 600 is used to analyze travel data. When analyzing the traveling data, an instruction to perform analysis is sent from the information processing terminal 600 to the data center 500. The processing device 510 of the data center 500 that has received the instruction performs analysis using a part of travel data among the enormous travel data stored in the storage device 520 of the data center 500. The travel data to be used is selected from the enormous amount of travel data stored in the storage device 520 in accordance with the purpose of analysis.

For example, the processing device 510 calculates a load applied to a specific object of the specific vehicle 10 based on the traveling data of the specific vehicle 10. The processing device 510 estimates the damage accumulated in the target based on the calculated load. For example, the processing device 510 calculates an index value indicating the magnitude of the damage accumulated in the oil for cooling the motor 20 of the specific vehicle 10 based on the traveling data of the specific vehicle 10. This index value indicates the degree of deterioration of the oil. The processing device 510 of the data center 500 outputs the calculated result by transmitting the calculated result to the information processing terminal 600. The information processing terminal 600 that has received the result displays the received result.

In order to perform such an analysis, the processing device 510 analyzes a large amount of travel data collected over a long period of time. Since the processing device 510 needs to perform an enormous amount of computation, it takes a long time to analyze.

Therefore, it is conceivable to extract the extracted data that captures the features of the entire original data from a large amount of travel data that is the original data. If such extracted data can be extracted, the processing device 510 can perform analysis in a shorter time by using the extracted data. For example, in the case of estimating the damage of the oil when the vehicle travels for 100,000 hours, the processing device 510 estimates the damage using the extracted data for 20,000 hours extracted from the original data for 100,000 hours. Then, the processing device 510 multiplies the index value calculated from the extracted data for 20,000 hours by 5 to calculate the index value of the oil damage of the motor 20 when the vehicle travels for 100,000 hours.

Figure 2A:
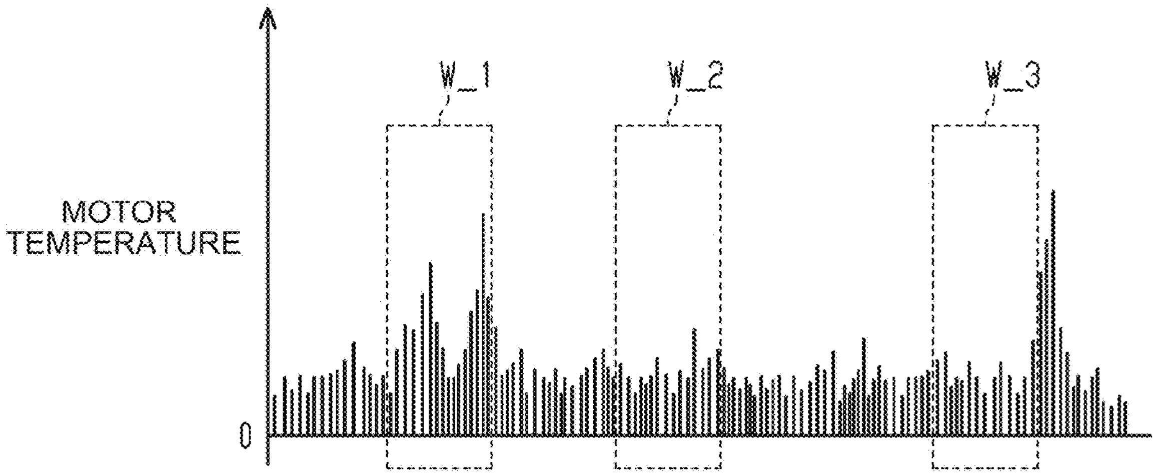
FIG. 2A is a graphical representation of the original data. It shows the trend of motor temp.
Figure 2B:
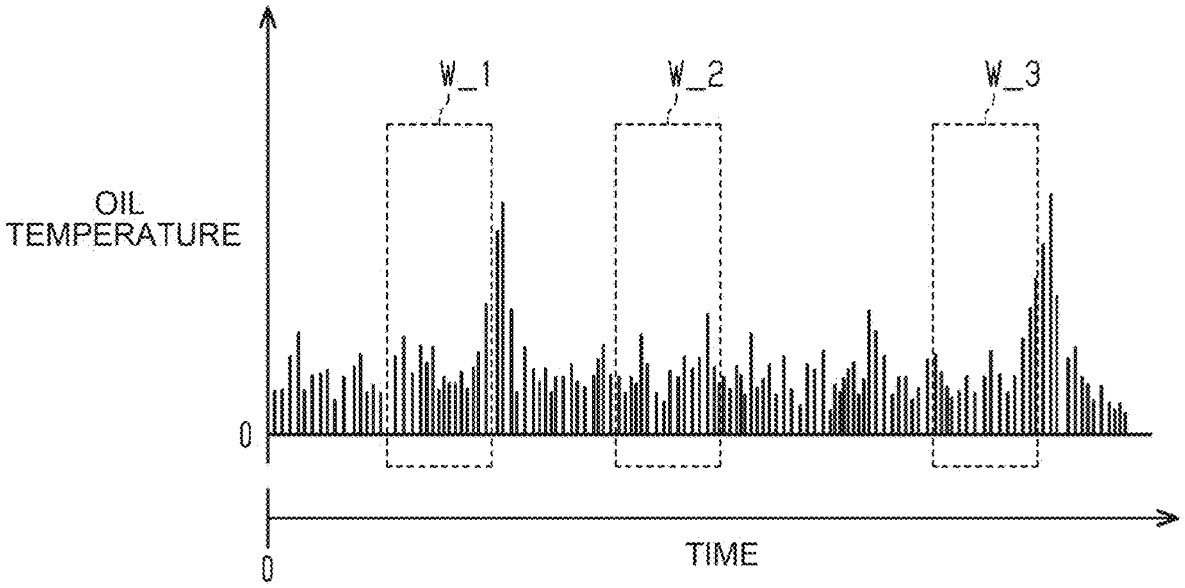
FIG. 2B is a graphic showing the original data. It shows the trend of the temperature of the oil in the motor.

FIGS. 2A and 2B show exemplary original-data. The original data shown in FIGS. 2A and 2B is travel data for 100,000 hours in one vehicle 10. The traveling data includes the temperature of the oil to be subjected to calculation of the index value of damage and the duration of the temperature of the oil. Further, the travel data includes the temperature of the motor 20 cooled by the oil and the duration of the temperature of the motor 20.

FIG. 2A shows, as an example of travel data, a change in temperature of the motor 20 for 100,000 hours. The data on the change in temperature of the motor 20 includes information on the temperature of the motor 20 and the duration of the temperature of the motor 20. FIG. 2B shows a change in temperature of the oil of the motor 20 for 100,000 hours. Data on the oil temperature transition of the motor 20 includes information on the oil temperature of the motor 20 and the duration time of the oil temperature.

Here, the temperature is, for example, a temperature in degrees Celsius (° C.). In this case, the temperature may be a value obtained by adding adjustment in order to treat the temperature in degrees Celsius (° C.) as a positive value. The temperature data is not limited to the temperature in degrees Celsius (° C.). For example, the temperature data may be an absolute temperature (K) or may be a value obtained by setting an arbitrary reference point to 0.

The temperature may be adjusted by multiplying the temperature by a weight in accordance with the tendency of the influence of the temperature on the deterioration of the oil. In an example, when the temperature is equal to or higher than a predetermined value, adjustment may be applied by multiplying the temperature by a weight. In addition, it is not necessary to use data of a temperature equal to or lower than a predetermined value to calculate the damage.

In the processing device 510, a plurality of temperature zones in which the temperatures are divided at regular intervals are set, and a time in which the temperatures are included in each temperature zone is defined as the duration of the temperature. The processing device 510 calculates the product of the temperature of the motor 20 and the duration of the temperature of the motor 20 as a feature based on the temperature transition data of the motor 20. The product of the temperature of the motor 20 and the duration of the temperature of the motor 20 is an example of data calculated from the temperature of the electric motor and the duration of the temperature of the electric motor.

processing device 510 calculates the product of the temperature of the oil in motor 20 and the duration of the temperature of the oils based on data of the temperature transitions of the oil in the motor 20. The product of the temperature of the oil in the motor 20 and the duration of the oil temperature is an example of data derived from the temperature of the oil in the electric motor and the duration of the temperature of the oil.

Here, the product of the temperature and the duration of the temperature is, in one example, the product of the average temperature and the duration of each temperature zone.

The original data is not limited to the duration of the temperature, and may include the travel distance of the vehicle 10 at the temperature. In this case, the processing device 510 may calculate the product of the temperature of the motor 20 and the travel distance as the feature. Here, the traveling distance is a distance traveled by the vehicle 10 while the temperature is included in the temperature range.

The product of the temperature of the motor 20 and the duration of the temperature of the motor 20 and the oil temperature of the motor 20 is correlated with the damage to the oil that cools the motor 20 of the vehicle 10. The processing device 510 at data center 500 estimates the damage of the oil from features calculated based on the original data, namely the product of the temperature of the motor 20 and the duration of the temperature of the motor 20 and the product of the temperature of the oil in the motor 20 and the duration of the temperature of the oil in the motor 20.

The extracted data is created by clipping the data from the original data by a plurality of time windows. In FIGS. 2A and 2B, three time windows of the first time window W_1, the second time window W_2, and the third time window W_3 are indicated by broken lines, respectively, as the plurality of time windows. The beginning and end of each time window are set such that the respective time windows do not overlap. In this example, the traveling data for 20,000 hours is extracted as the extracted data. Therefore, the start and end periods of each time window are set so that the total length of the time periods of all the time windows is 20,000 hours.

The data center 500 searches for the setting of the start time and the end time of each time window indicating the clipping pattern for extracting the extracted data that captures the features of the entire original data.

The data center 500 extracts the extracted data from the original data by using the clipping pattern found by the search. The data center 500 performs analysis using the extracted data.

Search Process of Clipping Pattern

Figure 3:
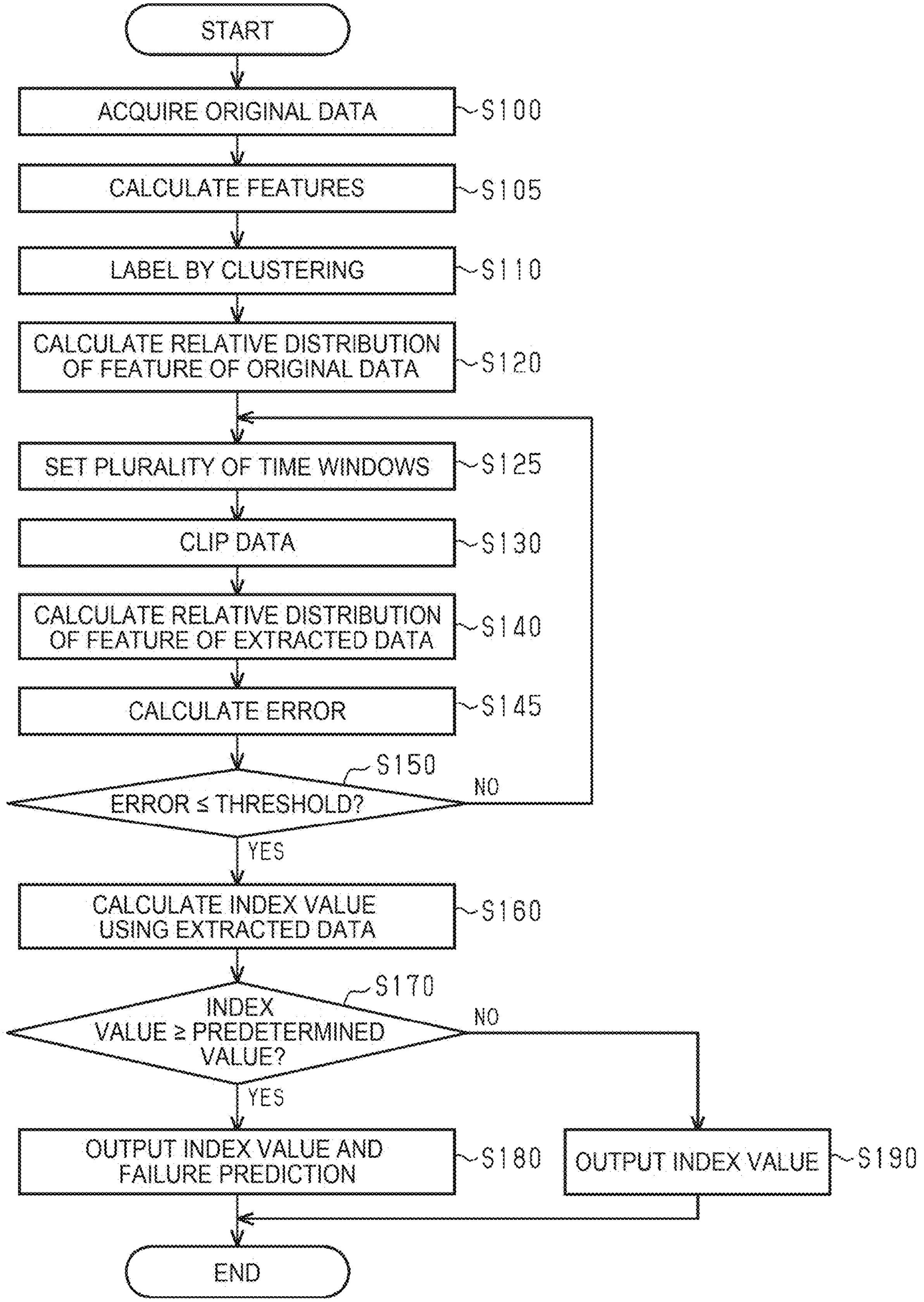
FIG. 3 is a flowchart illustrating a flow of processing performed by the processing device of the data center.

FIG. 3 is a flowchart illustrating a flow of a series of processes related to the search process of a clipping pattern. This series of processing is performed by the processing device 510 of the data center 500.

As illustrated in FIG. 3, the processing device 510 acquires the original-data in the processing of S100. The original data is a part of the travel data selected for the purpose of analysis from the enormous travel data stored in the storage device 520 of the data center 500. For example, the original data for calculating the index value indicating the magnitude of the damage accumulated in the oil in the motor 20 of a specific one vehicle 10 is travel data over a predetermined period of the target vehicle 10. For example, in the case of estimating the damage to the oil in the motor 20 when traveling for 100,000 hours, the original data is travel data over a predetermined period of the target vehicle 10.

In S105 process, the processing device 510 calculates the feature values based on the original data. Hereinafter, the feature calculated based on the original data may be referred to as the feature of the original data. In S110 process, the processing device 510 labels the original data by clustering. Specifically, the processing device 510 divides the original data at regular intervals. The length of the period for separating the original data is, for example, several minutes. Then, the processing device 510 performs clustering which is machine learning for classifying the data of each interval into a predetermined number of clusters. For example, k-means method is used as the algorithm of clustering. k-means method is a clustering algorithm for classifying data into a predetermined number of clusters. The clustering algorithm is not limited to k-means method.

The original data includes travel data collected under different environments. By performing clustering, the travel data included in the original data can be classified into clusters of travel data having similar characteristics. The number of clusters to be classified is arbitrarily set according to the contents of the analysis.

Figure 4:
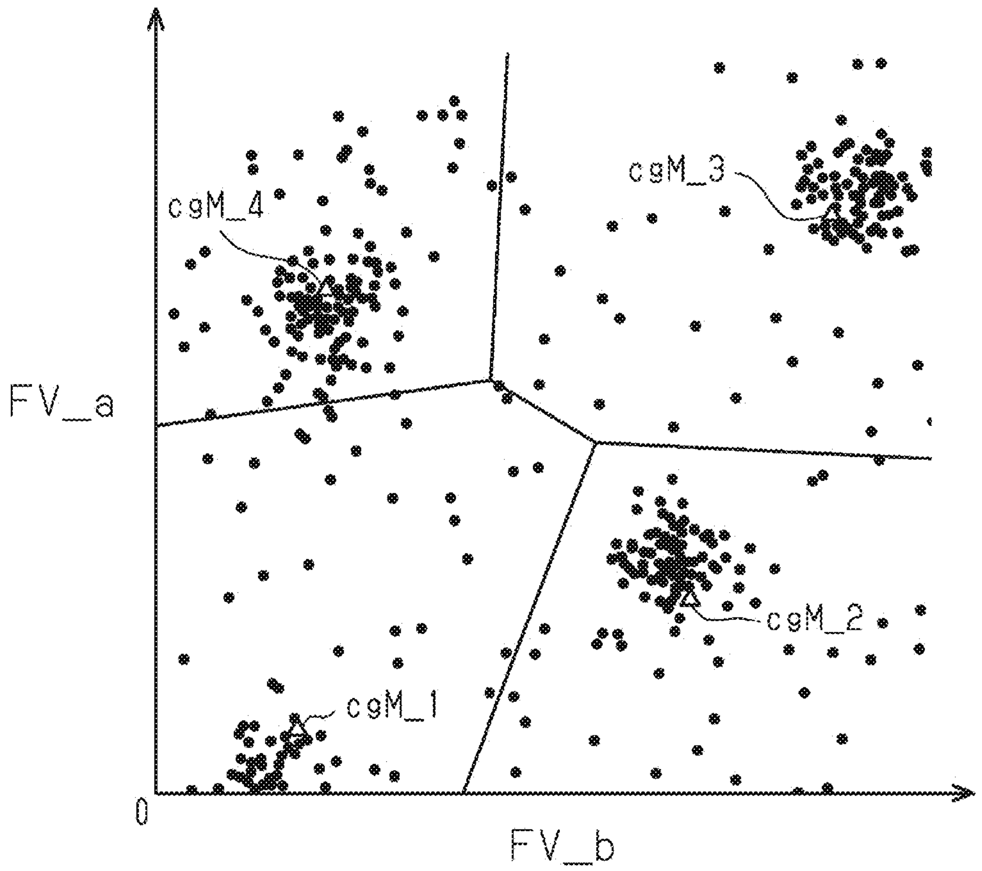
FIG. 4 is a graph of an example in which original data is clustered using two features.

FIG. 4 is a graph illustrating an exemplary clustering of original data into four clusters by a k-means method using two features calculated based on original data as explanatory variables. For example, the two features are the product of the temperature and the duration of the motor 20 and the product of the temperature and the duration of the oil of the motor 20. In FIG. 4, the data corresponding to each interval obtained by dividing the original data is indicated by one point. When performing clustering, the processing device 510 uses a representative value of an explanatory variable in the data of each interval. For example, the processing device 510 sets the average value of the features in the data of each interval as a representative value. The processing device 510 may use, as the representative value, the moving average value of the features in a plurality of consecutive intervals in time series.

In FIG. 4, these points are shown in a two-dimensional coordinate space in which the first feature FV_a and the second feature FV_b are defined as coordinate axes. FIG. 4 is an example in which original data is clustered in four clusters of the first cluster M_1, the second cluster M_2, the third cluster M_3, and the fourth cluster M_4. In FIG. 4, the boundaries of the four clusters are indicated by solid lines. In FIG. 4, the center of gravity of each cluster is indicated by an open triangle. The center of gravity cgM_1 is the center of gravity of the first cluster M_1. The center of gravity cgM_2 is the center of gravity of the second cluster M_2. The center of gravity cgM_3 is the center of gravity of the third cluster M_3. The center of gravity cgM_4 is the center of gravity of the fourth cluster M_4.

Although FIG. 4 shows an example in which the number of explanatory variables is two, the number of explanatory variables is not limited to two. For example, when the original data includes three features, the processing device 510 may perform clustering using these three features as explanatory variables. In this case, the processing device 510 clusters the original data in the three-dimensional coordinate space.

The processing device 510 assigns a label indicating the result of the clustering in this way to the original data. Specifically, each data indicated by a point in the coordinate space is given a label for identifying a cluster in which the data is classified. In this way, the processing device 510 creates the original data to which the label is attached.

Next, in S120 process, the processing device 510 calculates the relative frequency distributions of the features of the original data. The processing device 510 calculates a relative frequency distribution of the original data for each feature.

The frequency distribution classifies data into a plurality of classes, and represents a frequency distribution that is the number of data of each class. The relative frequency indicates how much the frequency of the class accounts for the sum of the total frequencies.

Figure 5A:
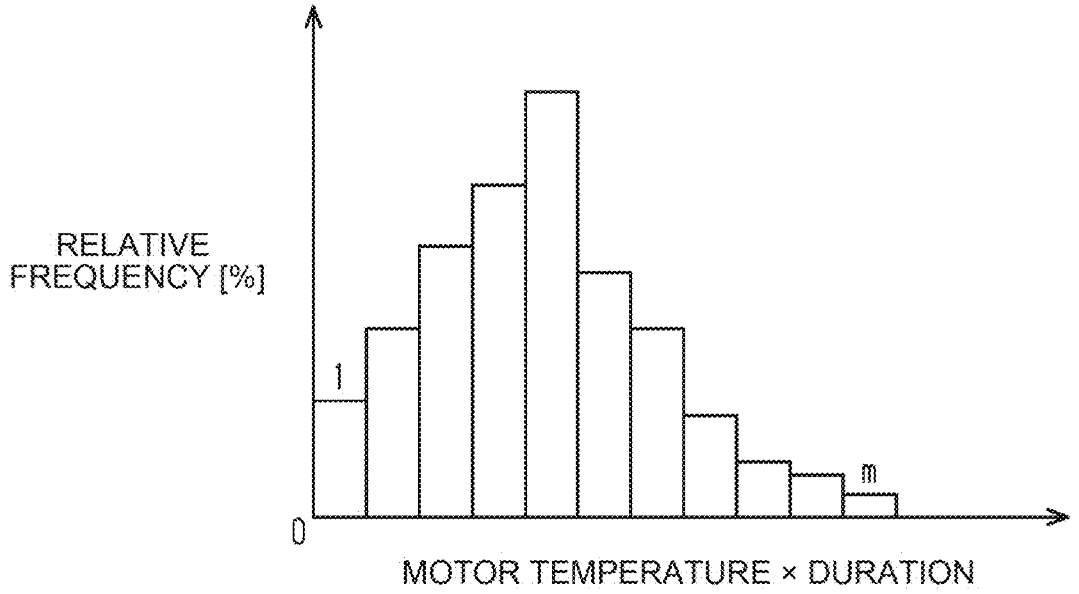
FIG. 5A is a graph of an example of a relative frequency distribution of each feature of the original data, showing a relative frequency distribution of the product of the motor temperature and the duration of the motor temperature.
Figure 5B:
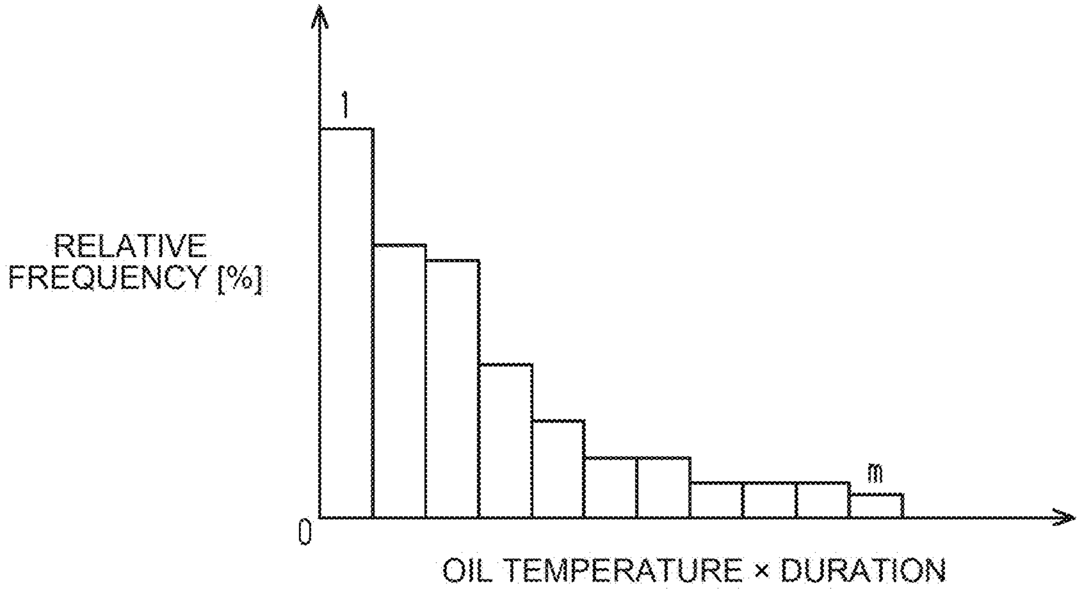
FIG. 5B is a graph of an example of a relative frequency distribution of each feature of the original data, showing a relative frequency distribution of the product of the oil temperature and the duration of the oil temperature.

FIG. 5A shows the relative frequency distribution for the product of the temperature of the motor 20 and the duration of the temperature of the motor 20 calculated based on the original data shown in FIG. 2A (temperature×duration of the motor). Here, the product of the duration of the temperature of the motor 20 in the original data is divided into m classes from 1 to m, and the relative frequency distribution is shown. FIG. 5B shows the relative frequency distributions for the product of the temperature of the oil in the motor 20 and the duration of the oil temperature in the original-data shown in FIG. 2B (oil temperature×duration). Here, the relative frequency distribution is shown by dividing the product between the temperature of the oil of the motor 20 in the original data and the duration time of the oil temperature into m classes from 1 to m.

In S120 process, the processing device 510 calculates the relative frequency distribution of each feature of the original data. The number of classes in the relative frequency distribution of each feature is the same.

For example, if, based on the original data, the product of the temperature of the motor 20 and the duration of the temperature of the motor 20 and the duration of the oil temperature of the motor 20 is calculated, the processing device 510 calculates the relative frequency distribution of each of these two features.

Next, in S125 process, the processing device 510 sets a plurality of time windows in order to extract the extracted data from the original data.

FIGS. 2A and 2B show three time windows W_1 to W_3 of the first time window W_1, the second time window W_2, and the third time window W_3 as an example of the time windows. In the example shown in FIGS. 2A and 2B, the time windows are all equal. As shown in FIGS. 2A and 2B, the data clipped by the respective clipping windows is data of each feature in the same time interval.

In S125 process, the processing device 510 randomly sets a plurality of time windows such that the sum of the periods of all the time windows is shorter than a predetermined period that is the total period of the original data. As will be described later, the processing device 510 combines all the data clipped according to the plurality of time windows set here to generate extracted data. The total time period of all the time windows is a value for determining the capacity of the extracted data. Therefore, a period in which all the time windows are summed is set in advance.

For example, the processing device 510 randomly sets the number of time windows, the start of each time window, and the end of each time window each time S125 process is performed. At this time, the processing device 510 sets each time window so that each time window does not overlap. The processing device 510 thus randomly sets the plurality of time windows such that the total period of all time windows is a preset period. In S125 process, the processing device 510 may set a plurality of time windows by fixing the time periods of the respective time windows to be constant, as illustrated in FIGS. 2A and 2B. In S125 process, the processing device 510 may fix the plurality of time windows to a fixed number and set the plurality of time windows.

In addition to the above requirements, when setting a plurality of time windows through S125, the processing device 510 sets the plurality of time windows such that the proportion of each cluster in the extracted data is equal to the proportion of each cluster in the entire original data.

In this way, by setting a plurality of time windows through S125 process, a clipping pattern in which data is clipped from the original data is determined. When the processing device 510 determines the clipping pattern in this way, the processing proceeds to S130.

In S130 process, the processing device 510 clips data from the original data in the determined clipping pattern. That is, in S130 process, the processing device 510 clips data from the original data by a plurality of set time windows. Then, the processing device 510 combines all the data clipped according to the plurality of time windows to create extracted data.

In the process of the following S140, the processing device 510 calculates the relative frequency distribution of the feature calculated from the extracted data. The processing device 510 calculates the relative frequency distribution of the feature calculated from the extracted data in the same manner as the method of calculating the relative frequency distribution in S120. In other words, in S140 process, the processing device 510 calculates the relative frequency distribution of the extracted data for each feature. At this time, the processing device 510 sets the number of classes in the relative frequency distribution of each feature to be the same as the relative frequency distribution in S120.

For example, as described above, when two features are calculated from the original data, the product of the temperature of the motor 20 and the duration of the temperature of the motor 20, and the product of the temperature of the oil in the motor 20 and the duration of the temperature of the oil, the processing device 510 calculates the relative frequency distributions of the two features in S140.

Next, in S145 process, the processing device 510 calculates an error between the relative frequency distribution of the features in the original data and the relative frequency distribution of the features in the extracted data. For example, the processing device 510 calculates a mean absolute error (MAE). The mean absolute error MAE is expressed by the following equation.

$$MAE = \frac{1}{n}\sum_{i=1}^{n}\sum_{j=1}^{m}|Y_{nm} - y_{nm}| \quad \text{Mathematical formula 1}$$

In the above equation, "n" is the number of features, and "m" is the number of classes in the relative frequency distribution. "Y" is the frequency of the corresponding feature in the original data in the corresponding class. "y" is the frequency of the corresponding feature in the extracted data in the corresponding class.

As shown in the above equation, the processing device 510 calculates, as an error, the sum of the errors of the frequencies in the respective classes for each feature quantity between the relative frequency distribution of the feature quantities in the entire original data and the relative frequency distribution of the feature quantities in the extracted data.

After calculating the error, the processing device 510 advances the processing to S150. In S150 process, the processing device 510 determines whether or not the calculated error is less than or equal to the thresholds. The threshold is a value for determining whether or not the extracted data having the relative frequency distribution close to the relative frequency distribution in the original data is extracted by the set clipping pattern. The magnitude of the threshold is set in advance so that it can be determined that extracted data having a relative frequency distribution close to the relative frequency distribution in the original data is extracted based on the error being equal to or smaller than the threshold.

In S150 process, when it is determined that the error is equal to or smaller than the threshold (S150: YES), the processing device 510 advances the process to S160. In S160 process, the processing device 510 calculates the intended index value using the extracted data generated in the process of the latest S130. Here, an index value indicating the magnitude of the damage accumulated in the oil of the motor 20 is calculated. For example, the processing device 510 calculates the degree of deterioration as an index value indicating the magnitude of damage accumulated in the oil of the motor 20.

The degree of deterioration is an index value representing a ratio of deterioration when the allowable limit of damage accumulated in the oil of the motor 20 is "1". Here, the damage applied to the oil of the motor 20 during a certain period is calculated from the product of the temperature of the motor 20 and the duration of the temperature of the motor 20 and the temperature of the oil of the motor 20. Then, the degree of damage that the motor 20 is considered to be damaged is set to "1", and the calculated rate of damage is calculated as an index value of deterioration. By repeating this, the calculated index value of the deterioration is integrated to calculate the degree of deterioration which is the ratio of the accumulated deterioration to the deterioration that the motor 20 is damaged. When the degree of deterioration becomes "1", the motor 20 is highly likely to be damaged, and the calculated degree of deterioration is a value from "0" to "1". Note that the allowable limit is an arbitrarily changeable value, and may be a value that is considered to cause damage to the motor 20 due to the use of oil having the deterioration degree, or may be a value that is considered to cause damage to the motor 20 at a time when the deterioration degree is reached. Also, the allowable limit may be a value at which the oil needs to be changed before the deterioration degree is reached.

Here, since the degree of deterioration is calculated using the extracted data which is a part of the original data, the processing device 510 converts the calculated degree of deterioration into a size corresponding to the original data, and calculates the degree of deterioration as the index value. For example, when the original data is traveling data for 100,000 hours and the extracted data is traveling data for 20,000 hours, the calculated degree of deterioration is multiplied by 5 to obtain the degree of deterioration as the index value.

On the other hand, in S150 process, when it is determined that the error is larger than the threshold (S150: NO), the processing device 510 returns the process to S125. Then, the processing device 510 performs the search process of S125 to S145 again.

In this way, the processing device 510 repeatedly performs the search process of S125 to S145 by changing the settings of the plurality of time windows, and extracts extracted data in which the error becomes equal to or less than the threshold from the original data. Then, the processing device 510 calculates an index value using the extracted data. After calculating the index value, the processing device 510 advances the processing to S170.

In S170 process, the processing device 510 determines whether or not the index value is equal to or greater than a predetermined value. The default value is a value for predicting that damage is more likely to occur based on the fact that the index value is equal to or larger than the default value. For example, "0.9" can be set as a default value in the degradation degree. In this case, it is possible to predict that the possibility of damage is high based on the fact that 90% of the deterioration leading to damage has been reached.

In S170 process, when it is determined that the index value is equal to or greater than the predetermined value (S170: YES), the processing device 510 advances the process to S180. In S180 process, the processing device 510 outputs an index value and a failure prediction. Specifically, the processing device 510 transmits the index value and the failure prediction to the information processing terminal 600 that has transmitted the instruction for requesting the analysis.

The failure prediction is, for example, a message indicating that the occurrence of a failure has been predicted. In this way, when the calculated index value is equal to or greater than the predetermined value, the processing device 510 notifies that the occurrence of the failure has been predicted. The failure prediction may be information of a lifetime until a failure occurs. For example, when the index value is the degree of deterioration calculated by using the extracted data extracted from the original data for 100,000 hours, the processing device 510 calculates the traveling time until the degree of deterioration reaches "1" and outputs the calculated traveling time as the information on the service life. The information on the service life may be converted into the traveling distance based on the travel distance of 100,000 hours and output.

In S170 process, when it is determined that the index value is less than the predetermined value (S170: NO), the processing device 510 advances the process to S190. In S190 process, the processing device 510 outputs an index value. Specifically, the processing device 510 transmits the index value to the information processing terminal 600 that has transmitted the instruction for requesting the analysis.

When S180 or S190 process is performed, the processing device 510 terminates the series of processes.

Operation of this Embodiment

The data center 500, which is an information processing device according to the present embodiment, acquires original data collected and created over a predetermined period using a plurality of sensors mounted on the vehicle 10, and calculates an index value indicating the magnitude of damage accumulated in the oil of the motor 20.

The data center 500 includes a processing device 510 configured to perform a process. The original data includes information on the temperature of the motor 20 and the duration of the temperature of the motor 20. Based on this information, the product of the temperature of the motor 20 and the duration of the temperature of the motor 20 is calculated as a feature. In addition, the original data contains information on the temperature of the oil of motor 20 and the duration of the temperature of the oil, and based on this information, the product of the temperature of the oil of motor 20 and the duration of the temperature of the oil is calculated as the feature. The product of the temperature of the oil of motor 20 and the duration of the temperature of the oil is an example of the feature calculated from the temperature of the oil and the duration of the temperature of the oil.

In the data center 500, the search process that is performed by the processing device 510 includes a first step of calculating a relative frequency distribution for each of the features calculated based on the original data (S120). The search process includes a second step of setting a plurality of time windows for clipping data of a partial period of the original data in such a manner that the sum of periods of all the time windows is shorter than the predetermined period (S125). The search process includes a third step of clipping data from the original data according to the time windows (S130). The search process includes a fourth step of calculating, for each of the features, the relative frequency distribution of the feature calculated based on extracted data obtained by combining all the data clipped according to the time windows (S140). The search process includes a fifth step of calculating an error between the relative frequency distribution of the feature of the original data and the relative frequency distribution of the feature of the extracted data (S145). In the search process, after performing the first step, the processing device 510 repeatedly performs a trial from the second step to the fifth step by changing the settings of the time windows. Then, the processing device 510 extracts the extracted data in which the error is equal to or less than the threshold (S150: YES). The processing device 510 calculates an index value using the extracted data in which the error becomes equal to or smaller than the threshold (S160).

According to the data center 500, it is possible to obtain extracted data in which features of the entire original data are captured with respect to a plurality of features. Therefore, the data center 500 can calculate the index value with the same accuracy as in the case of using the original data by using the extracted data.

Effect of this Embodiment (1) According to the data center 500 which is the information processing device of the present embodiment, it is possible to calculate the index value in a shorter time than in the case where the original data is used.

(2) The processing device 510 performs clustering, which is machine learning for classifying the data of the sections obtained by dividing the original data into a predetermined number of clusters at regular intervals (S110). Then, in the second step (S125) of the search process, the processing device 510 sets a plurality of time windows such that the proportion of each cluster in the extracted data is equal to the proportion of each cluster in the entire original data.

A plurality of intervals classified into the same cluster are intervals having similar characteristics. In the above search process, the setting output from the processing device 510 is a setting that allows to clip such extracted data that the proportion of each cluster in the extracted data is the same as that of each cluster in the entire original data and that the relative frequency distribution of each feature in the extracted data is close to that of each feature in the entire original data.

Therefore, according to the search process performed by the data center 500, it is possible to find a setting in which extracted data that is closer to the feature of the entire original data can be obtained for a plurality of features.

(3) The processing device 510 terminates the search process when one piece of extracted data whose error becomes equal to or smaller than the threshold can be extracted, and calculates an index value using the extracted data whose error becomes equal to or smaller than the threshold. Therefore, the data center 500 can calculate an index value at a time point when one piece of extracted data whose error becomes equal to or smaller than the threshold can be extracted, and output the result promptly.

(4) When the calculated index value is equal to or greater than the predetermined value (S170: YES), the processing device 510 notifies that a failure has been predicted. Therefore, the data center 500 can notify the user that the occurrence of the failure has been predicted before the failure occurs.

Example of Change

The present embodiment can be modified and implemented as follows. The present embodiment and modification examples described below may be carried out in combination of each other within a technically consistent range.

In the above embodiment, an example in which the information processing device is embodied as the data center 500 has been described. An example in which the index value is calculated in the data center 500 has been described. On the other hand, the information processing device described above may be embodied as the information processing terminal 600. In this case, the calculation of the index value is performed by the processing device 610 of the information processing terminal 600. The above-described information processing device may be embodied as a control device of the vehicle 10. In this case, the calculation of the index value can also be performed by the control device of the vehicle 10. For example, the calculation of the index value can be performed by the control device 40 of the vehicle 10.

In the above-described embodiment, an example has been described in which one piece of extracted data is extracted and an index value is calculated. On the other hand, a final index value may be determined by extracting a plurality of pieces of extracted data and using a plurality of index values calculated using the respective pieces of extracted data. For example, the minimum value, the maximum value, the mode value, and the average value are set as final index values. Further, a plurality of index values may be output.

In the above-described embodiment, an example has been described in which, when the index value is equal to or larger than a predetermined value, it is notified that the occurrence of a failure has been predicted. This may be omitted. After the index value is calculated, only S190 process may be performed, and only the index value may be outputted.

Figure 6:
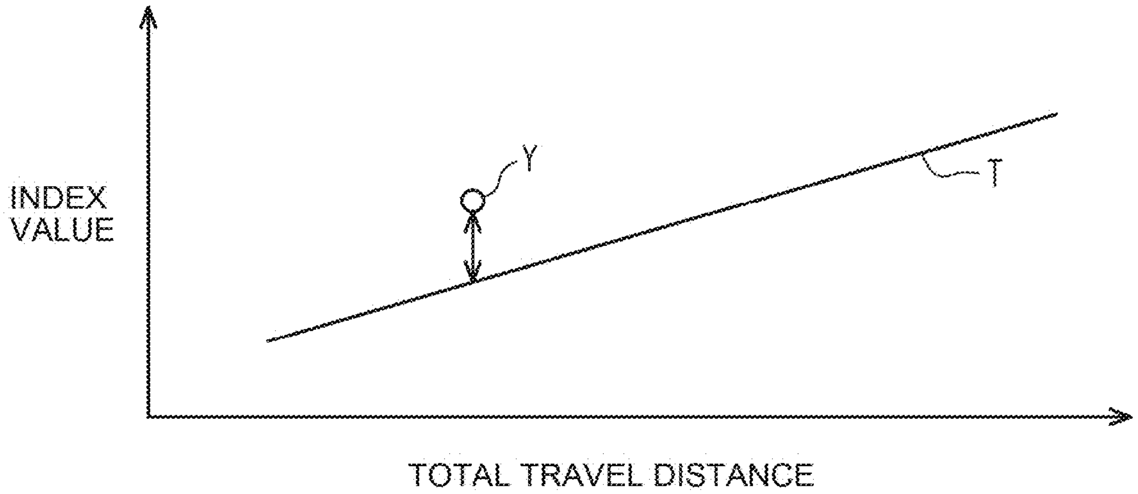
FIG. 6 is a graph of an example of a method of determining an abnormality based on a comparison between a total travel distance and an index value.

The data center may predict the occurrence of a failure of the motor 20 based on a comparison between the index value and the total travel distance of the vehicle or the total travel time of the vehicle. In this case, even when the index value does not reach the predetermined value or more, the occurrence of a failure can be predicted when the index value is significantly larger than the standard index value for the total travel distance or the total travel time. For example, as shown in FIG. 6, the standard straight line T indicating the tendency of the index value with respect to the total travel distance may be compared with the index value Y to predict a failure when the index value Y is significantly large.

In the above-described embodiment, the degree of deterioration is given as an example of the index value to be calculated, but the index value to be calculated is not limited to the degree of deterioration.

In a case where there is a plurality of targets for which damage is to be calculated, an index value of each damage may be calculated for each target. The respective relative frequency distributions may be calculated for the feature quantities of the respective objects, and the clipping pattern may be searched so that the error of the relative frequency distributions for all the feature quantities becomes small.

The clipping pattern may be searched for so that the relative frequency distribution of the feature quantity becomes small for each object. Then, the index value may be calculated for each object.

The processing device 510 sets a plurality of time windows such that the proportion of each cluster in the original data is equal to the proportion of each cluster in the extracted data. Without such a restriction, the processing device 510 may set a plurality of time windows. In such cases, the process S110 clustering may be omitted.

The method of determining the setting of the time window in the clipping pattern may not be random. The trial may be repeated by changing the setting of the time window in the clipping pattern according to a preset rule.

The error calculated in S145 process is not limited to the mean absolute error MAE. For example, the processing device 510 may calculate a mean square error as an error. The processing device 510 may calculate a root mean square error as an error.

In the above embodiment, the product of the temperature of the motor 20 and the duration of the temperature of the motor 20 is exemplified as the data calculated from the temperature of the electric motor and the duration of the temperature of the electric motor, but the present disclosure is not limited thereto. For example, the data of the temperature of the motor 20 and the duration of the temperature of the motor 20 may each be a feature value.

In the above embodiment, the product of the temperature of the oil and the duration of the temperature of the oil is exemplified as data calculated from the temperature of the oil and the duration of the temperature of the oil, but the present disclosure is not limited thereto. In one example, the temperature of the oil and the duration of the temperature of the oil may be features.

What is claimed is:

1. An information processing system comprising:
a vehicle including
a motor,
a vehicle control device,
a first sensor configured to acquire a motor temperature of the motor, and
a second sensor configured to acquire an oil temperature of oil that cools the motor;
an information processing device including a processor; and
an information processing terminal, wherein
the vehicle control device is configured to collect, over a predetermined period, original data including the motor temperature, a first duration of the motor temperature, the oil temperature, and a second duration of the oil temperature, and transmit the original data to the information processing device, and
the processor is configured to
calculate, based on the original data, a plurality of features including (i) a product of the motor temperature and the first duration of the motor temperature and (ii) a product of the oil temperature and the second duration of the oil temperature,
perform clustering, the clustering being machine learning that groups data of each interval obtained by dividing the original data into intervals of a certain period into a predetermined number of clusters,
calculate, for each of the features, a relative frequency distribution of the original data,
set a plurality of time windows for clipping data of a partial period of the original data such that a sum of periods of all the time windows is shorter than the predetermined period and such that a difference between a proportion of each of the clusters in extracted data and a proportion of each of the clusters in the original data is equal to or less than a cluster threshold,
clip data from the original data according to the time windows,
calculate, for each of the features, the relative frequency distribution of extracted data obtained by combining all the data clipped according to the time windows,
calculate an error between the relative frequency distribution of the original data and the relative frequency distribution of the extracted data,
change settings of the plurality of time windows and repeat following steps (i) to (iii) until the error is equal to or less than a first threshold: (i) the clipping, (ii) the calculation of the relative frequency distribution of the extracted data, and (iii) the calculation of the error,
in a case where the error is equal to or less than the first threshold, calculate, using the extracted data, an index value indicating a degree of deterioration of the oil, the degree of deterioration representing a ratio of deterioration relative to an allowable limit of damage accumulated in the oil;

determine whether the index value is equal to or greater than a second threshold, and in a case where the index value is equal to or greater than the second threshold, determine that occurrence of a failure of the motor is predicted, and transmit, to the information processing terminal, a message indicating that occurrence of the failure has been predicted.

2. The information processing system according to claim 1, wherein the processor is configured to calculate, as the error, a sum of differences in a relative frequency of each class between the relative frequency distribution of the original data and the relative frequency distribution of the extracted data.

* * * * *